United States Patent
Kim et al.

(10) Patent No.: US 8,332,903 B2
(45) Date of Patent: Dec. 11, 2012

(54) SYSTEM, APPARATUS AND METHOD OF PROVIDING PERSONAL BROADCASTING SERVICE ACCORDING TO SCHEDULING

(75) Inventors: Mun-jo Kim, Suwon-si (KR);
Soon-back Cha, Suwon-si (KR);
Kyoung-je Oh, Suwon-si (KR); Sun-bal Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 780 days.

(21) Appl. No.: 11/845,496

(22) Filed: Aug. 27, 2007

(65) Prior Publication Data
US 2008/0229365 A1   Sep. 18, 2008

(30) Foreign Application Priority Data
Mar. 12, 2007   (KR) ........................ 10-2007-0024128

(51) Int. Cl.
*H04N 7/173* (2011.01)
(52) U.S. Cl. ............ 725/119; 725/54; 725/56; 725/121; 725/115; 725/117; 725/145; 725/146; 725/147; 725/148
(58) Field of Classification Search ........................ None
See application file for complete search history.

(56) References Cited

U.S. PATENT DOCUMENTS

| | | | |
|---|---|---|---|
| 6,774,926 B1* | 8/2004 | Ellis et al. | 348/14.01 |
| 7,194,757 B1* | 3/2007 | Fish et al. | 725/121 |
| 2002/0056119 A1* | 5/2002 | Moynihan | 725/87 |
| 2002/0157103 A1* | 10/2002 | Song et al. | 725/97 |
| 2004/0114036 A1* | 6/2004 | Karaoguz et al. | 348/142 |
| 2004/0172654 A1* | 9/2004 | Pei et al. | 725/96 |
| 2005/0138560 A1* | 6/2005 | Lee et al. | 715/719 |
| 2007/0199019 A1* | 8/2007 | Angiolillo et al. | 725/39 |
| 2008/0043760 A1* | 2/2008 | Venkatraman et al. | 370/401 |

FOREIGN PATENT DOCUMENTS

| | | |
|---|---|---|
| JP | 2000-151595 A | 5/2000 |
| KR | 10-2001-0087853 A | 9/2001 |
| KR | 10-2001-0093584 A | 10/2001 |
| KR | 10-2002-0006969 A | 1/2002 |
| KR | 10-2002-0096412 A | 12/2002 |
| KR | 10-2005-0102522 A | 10/2005 |

* cited by examiner

*Primary Examiner* — Dominic D Saltarelli
*Assistant Examiner* — Jason J Chung
(74) *Attorney, Agent, or Firm* — Sughrue Mion, PLLC

(57) ABSTRACT

A system, apparatus, and method of providing a personal broadcasting service according to scheduling are provided. The system for providing a personal broadcasting service includes a producer client which produces and transmits a broadcasting schedule, a broadcasting server which establishes a broadcasting channel according to the broadcasting schedule and provides broadcasting content produced by the producer client through the broadcasting channel, and a viewer client which receives the broadcasting content through the broadcasting channel.

12 Claims, 7 Drawing Sheets

FIG. 3

| BROADCASTING TIME | CONTENT OF BROADCAST |
|---|---|
| 9:00 – 11:00 | IDEA CONFERENCE |
| 11:00–12:00 | CONFERENCE CALL |
| 13:30–15:00 | MOVIE BROADCASTING |
| 15:00–17:00 | MUSIC LISTENING |

SYSTEM, APPARATUS AND METHOD OF PROVIDING PERSONAL BROADCASTING SERVICE ACCORDING TO SCHEDULING

CROSS-REFERENCE TO RELATED APPLICATION

This application is based on and claims priority from Korean Patent Application No. 10-2007-0024128, filed on Mar. 12, 2007 in the Korean Intellectual Property Office, the disclosure of which is incorporated herein in its entirety by reference.

BACKGROUND OF THE INVENTION

1. Field of the Invention

Systems, apparatuses, and methods consistent with the present invention relate to a personal broadcasting service, and, more particularly, to providing a personal broadcasting service according to scheduling.

2. Description of the Related Art

Recently, with the development of broadcasting and communication technologies, personal broadcasting services are provided to Internet users through several Internet websites.

If a user produces broadcasting content using a web camera connected to a user's computer or an application program for capturing data and uploads the produced broadcasting content to a server, the server collects the uploaded broadcasting content to produce a list of broadcasting content and establishes a channel for transmitting the broadcasting content.

A plurality of subscribers that access the server, select desired broadcasting content using the produced list, and receive the broadcasting content in a streaming form through the established channel, or download the broadcasting content from the server to view the broadcasting content.

In the personal broadcasting service as described above, however, the server merely provides the uploaded broadcasting content to the Internet users. In other words, the server cannot provide the broadcasting content produced by the user to the Internet users through establishment of a channel at a time desired by the user, and thus there exists a limitation in using the personal broadcasting service.

Accordingly, there is a need for a personal broadcasting service in which the scheduling of a broadcasting content producer with respect to the broadcasting content is reflected.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a system, apparatus, and method of providing broadcasting content according to scheduling of a broadcasting content producer.

According to an aspect of the present invention, there is provided a system for providing a broadcasting service according to scheduling, according to the present invention, which includes a producer client producing and transmitting a broadcasting schedule; a broadcasting server establishing a broadcasting channel according to the transmitted broadcasting schedule, and providing broadcasting content produced by the producer client through the established broadcasting channel; and a viewer client receiving the broadcasting content through the established broadcasting channel.

According to another aspect of the present invention, there is provided a producer client providing a broadcasting service according to scheduling, which includes a broadcasting-schedule-producing module producing a broadcasting schedule; a control module uploading the prepared broadcasting schedule to a broadcasting server; and a broadcasting-content-producing module producing broadcasting content related to a broadcast configuring the broadcasting schedule; wherein if a broadcasting channel is established in the broadcasting server according to the broadcasting schedule, the control module uploads the produced broadcasting content to the broadcasting server.

According to still another aspect of the present invention, there is provided a producer client providing a broadcasting service according to scheduling, which includes a broadcasting-schedule-producing module receiving an allocation of a specified time zone of a broadcasting channel from a broadcasting server, and producing broadcasting schedule information in the allocated time zone; a control module uploading the produced broadcasting schedule to the broadcasting server; and a broadcasting-content-producing module producing broadcasting content related to a broadcast configuring the broadcasting schedule; wherein if the broadcasting channel is established in the broadcasting server according to the broadcasting schedule, the control module uploads the produced broadcasting content to the broadcasting server.

According to still another aspect of the present invention, there is provided a broadcasting server providing a broadcasting service according to scheduling, which includes a broadcasting-schedule-management module managing broadcasting schedule information provided by a producer client; a channel-management module establishing a broadcasting channel according to the broadcasting schedule information; and a broadcasting control module that broadcasts broadcasting content related to a broadcast according to the broadcasting schedule through the established broadcasting channel.

According to still another aspect of the present invention, there is provided a method of providing a broadcasting service according to scheduling, which includes: producing a broadcasting schedule; uploading the prepared broadcasting schedule to a broadcasting server; producing broadcasting content related to a broadcast configuring the broadcasting schedule; and if a broadcasting channel is established according to the broadcasting schedule in the broadcasting server, uploading the produced broadcasting content to the broadcasting server.

According to still another aspect of the present invention, there is provided a method of providing a broadcasting service according to scheduling, which includes: storing broadcasting schedule information provided by a producer client; establishing a broadcasting channel according to the broadcasting schedule information; and broadcasting content related to a broadcast according to the broadcasting schedule through the established broadcasting channel.

According to still another aspect of the present invention, there is provided a method of providing a broadcasting service according to scheduling, which includes: a producer client producing and transmitting a broadcasting schedule; a broadcasting channel establishing a broadcasting channel according to the transmitted broadcasting schedule, and providing broadcasting content produced by the producer client through the established broadcasting channel; and a viewer client receiving the broadcasting content through the established broadcasting channel.

According to still another aspect of the present invention, there is provided a method of providing a broadcasting service according to scheduling, which includes receiving an allocation of a specified time zone of a broadcasting channel from a broadcasting server; setting broadcasting schedule information in the allocated time zone; transmitting the set broadcasting schedule information to the broadcasting server; and transmitting corresponding broadcasting content to the broadcasting server according to the set broadcasting schedule information.

BRIEF DESCRIPTION OF THE DRAWINGS

The above and other aspects of the present invention will be apparent from the following detailed description of exemplary embodiments taken in conjunction with the accompanying drawings, in which:

FIG. 3 is a view illustrating the scheduling prepared by a broadcasting producer;

DETAILED DESCRIPTION OF EXEMPLARY EMBODIMENTS

Figure 1:
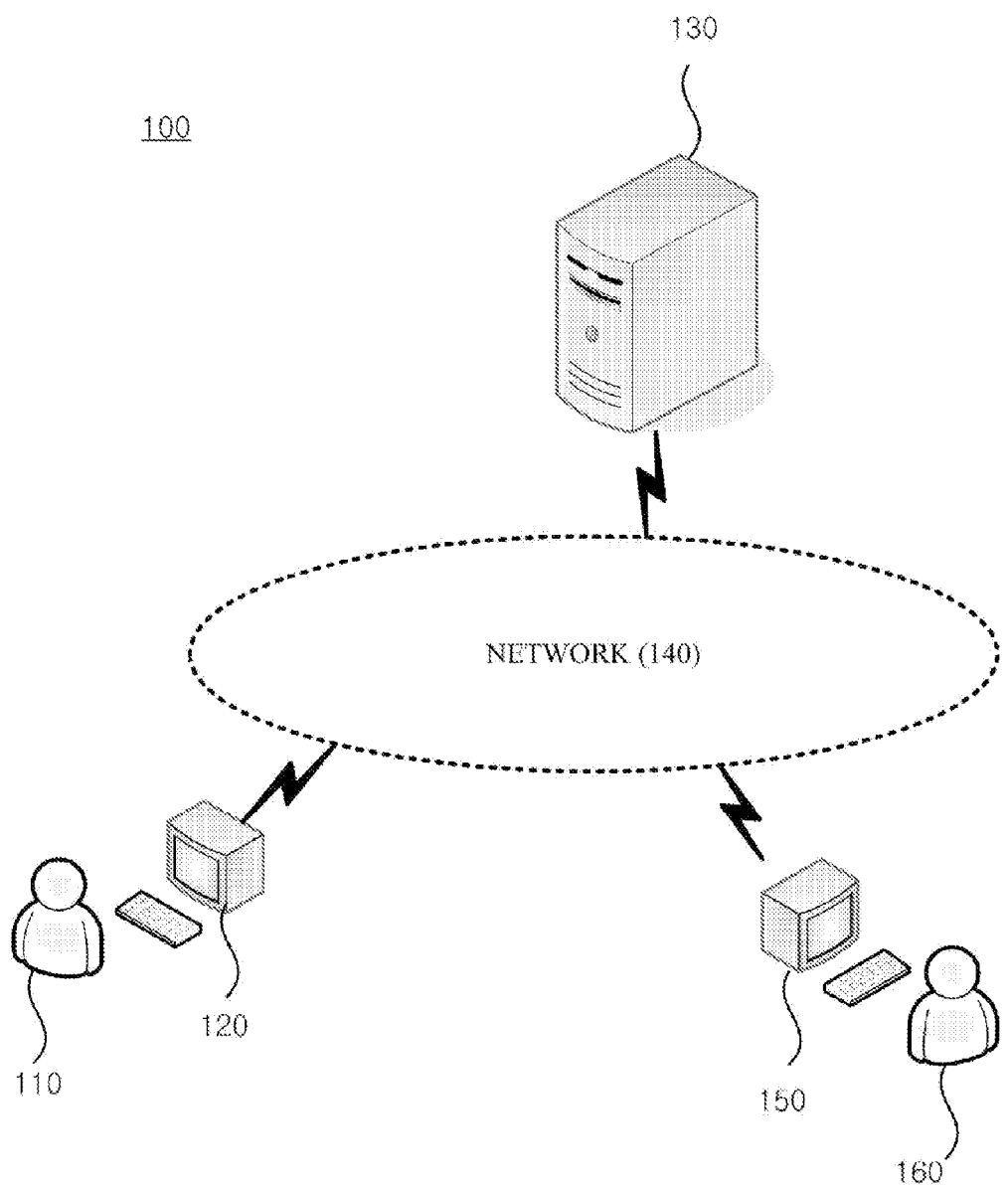
FIG. 1 is a view illustrating the construction of a system for providing a personal broadcasting service according to an exemplary embodiment of the present invention.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims. In the entire description of the present invention, the same drawing reference numerals are used for the same elements across various figures.

The exemplary embodiments of present invention will be described herein with reference to the accompanying drawings illustrating block diagrams and flowcharts for explaining a system, apparatus, and method of providing broadcasting content according to scheduling according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

FIG. 1 is a view illustrating the construction of a system for providing a personal broadcasting service according to an exemplary embodiment of the present invention.

Referring to FIG. 1, a system 100 for providing a personal broadcasting service includes a producer client 120, a broadcasting server 130, and a viewer client 150.

The producer client 120 transmits a broadcasting schedule prepared by a broadcasting producer 110 to the broadcasting server 130 through a network 140. Also, the producer client 120 produces broadcasting content using a web camera or an application program for capturing data, and uploads the produced broadcasting content to the broadcasting server 130 through the network 140 according to the prepared broadcasting schedule.

The broadcasting server 130 establishes a broadcasting channel according to the broadcasting schedule prepared by the broadcasting producer 110, and transmits the broadcasting content produced by the producer client 120 to the viewer client 150 through the established broadcasting channel.

The viewer client 150 accesses the broadcasting server 130 through the network 140 to receive the broadcasting content, and provides the received broadcasting content to a broadcasting viewer 160.

In this case, it should be understood that the producer client 120, the broadcasting server 130, and the viewer client 150 may be implemented not only by hardware but also by software.

Figure 2:
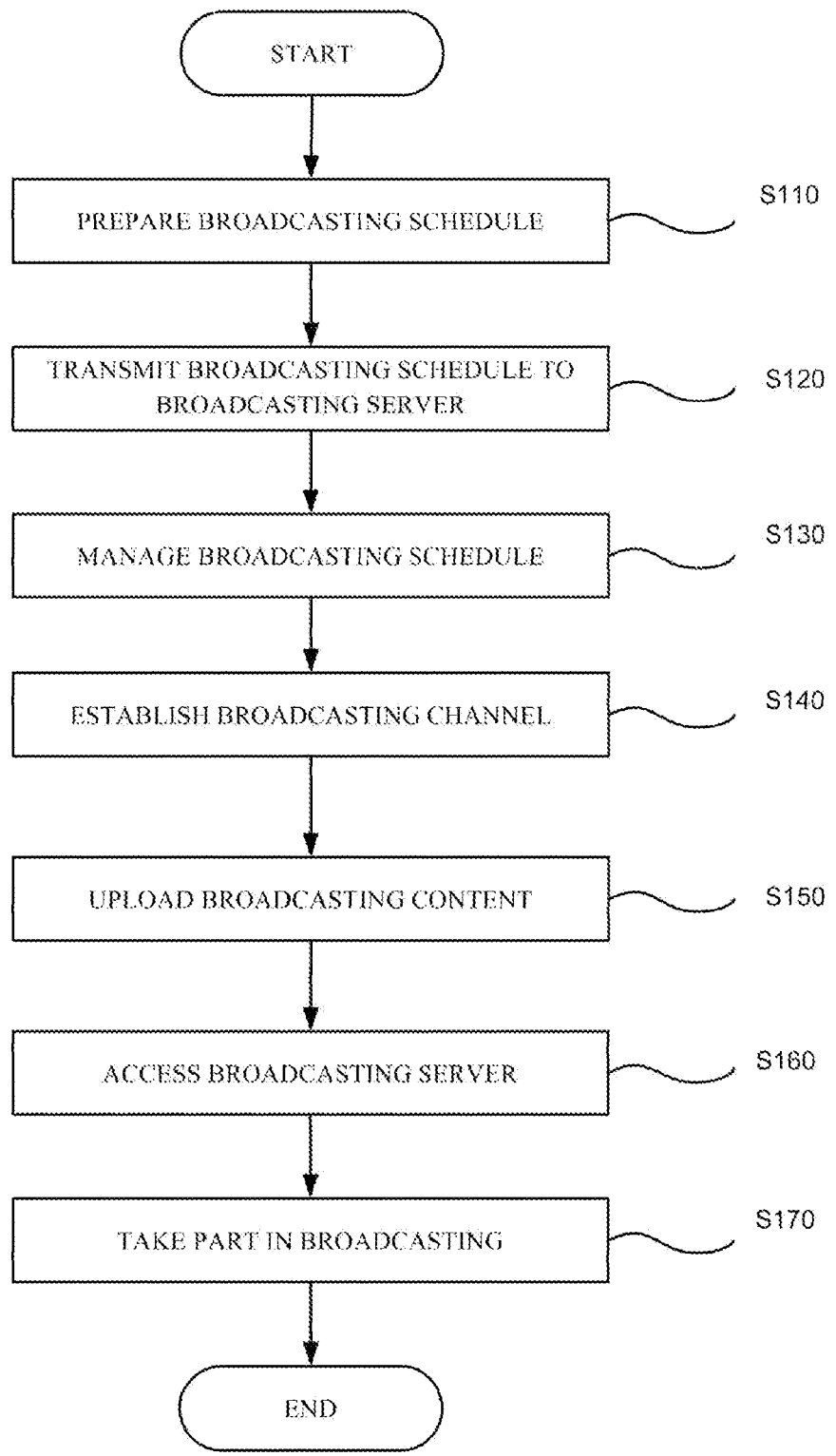
FIG. 2 is a flowchart illustrating a process for providing a personal broadcasting service according to an exemplary embodiment of the present invention.

The operation of each element as shown in FIG. 1 will now be described with reference FIG. 2, which is a flowchart illustrating a process for providing a personal broadcasting service according to an exemplary embodiment of the present invention.

First, the broadcasting producer 110 prepares the broadcasting schedule using the producer client 120 (S110).

In this case, the broadcasting schedule may be configured in a form as shown in FIG. 3. For example, the broadcasting producer 110 prepares a broadcasting schedule (composed of an idea conference in charge of the broadcasting producer 110 from 9:00 to 11:00; a conference call from 11:00 to 12:00;

movie broadcasting from 13:30 to 15:00; and music listening from 15:00 to 17:00), and transmits the prepared broadcasting schedule to the broadcasting server 130 through the network 140 (S120).

After being allocated with a specified time zone for a broadcasting channel from the broadcasting server 130, the broadcasting producer 110 may prepare the broadcasting schedule by setting broadcasting schedule information, such as a title of a broadcast, a broadcasting time, content of the broadcast, and so forth, within the allocated time.

The broadcasting server 130 receives the broadcasting schedule transmitted from the producer client 120, and manages the received broadcasting schedule (S130).

In this case, managing the broadcasting schedule means storing the broadcasting schedule transmitted from the producer client 120 and checking the broadcasting time according to the broadcasting schedule. Also, managing the broadcasting schedule means preparing and storing a broadcasting schedule list based on the broadcasting schedule transmitted from the producer client 120 so that the broadcasting viewer 160 can know in advance the content of the broadcast. The list of the broadcasting schedule may be configured to display the respective broadcasting schedules received from a plurality of producer clients.

In the case that the broadcasting time arrives according to the broadcasting schedule while the broadcasting schedule is maintained by the broadcasting server 130, the broadcasting server 130 establishes a broadcasting channel (S140).

The established broadcasting channel may be understood as a passage, channel or bandwidth used to transmit the broadcasting content produced by the producer client 120 to the viewer client 150.

If the broadcasting time arrives after the broadcasting server 130 allocates in advance a memory region to establish the broadcasting channels in the broadcasting server 130, the broadcasting server 130 searches an empty region in a memory to establish the broadcasting channel. Alternatively, the broadcasting server 130 may generate a processor through a thread method to manage the establishing, updating, and closing of the broadcasting channel. In consideration of the memory management, the former is called a static channel management and the latter is called a dynamic channel management. The channel management may be implemented by a conventional method.

If the broadcasting channel is established in the above process, the broadcasting producer 110 produces the broadcasting content using the web camera or the application program for capturing data, and uploads the produced broadcasting content to the broadcasting server 130 through the network 140 (S150). In this case, the broadcasting server 130 links the uploaded broadcasting content with the broadcasting channel.

The broadcasting viewer 160 accesses the broadcasting server 130 through the viewer client 150 (S160). After searching the broadcasting schedule list provided by the broadcasting server 130, the broadcasting viewer 160 selects the broadcasting being presently broadcast, so that the broadcasting viewer 160 participates in the broadcast (S170).

At this time, the viewer client 150 may receive the broadcasting content in a streaming form from the broadcasting server 130.

Figure 4:
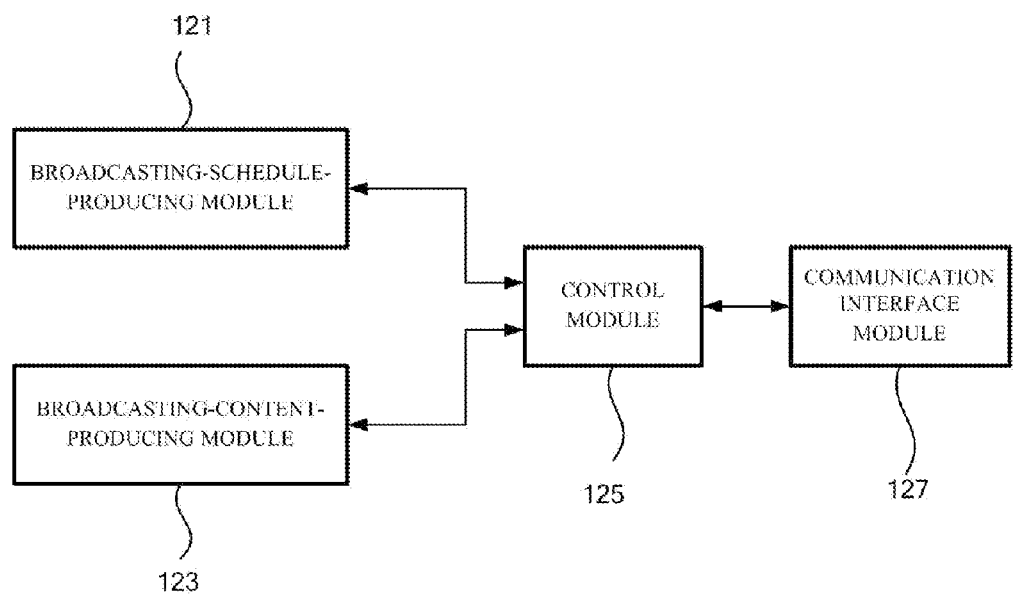
FIG. 4 is a view illustrating the construction of a producer client according to an exemplary embodiment of the present invention.

FIG. 4 is a view illustrating the construction of the producer client according to an exemplary embodiment of the present invention.

Referring to FIG. 4, the producer client 120 according to the present invention includes a broadcasting schedule producing module 121, a broadcasting content producing module 123, a control module 125, and a communication interface module 127.

The broadcasting schedule producing module 121 provides an interface for enabling the broadcasting producer 110 to prepare the broadcasting schedule as shown in FIG. 3.

The broadcasting-content-producing module 123 provides means for enabling the broadcasting producer 110 to produce the broadcasting content to be broadcast through the network 140 such as the Internet by using the web camera connected to the producer client 120 or the application program for capturing data. In this case, the application program captures a moving image, a still image, or data displayed on a screen of the producer client 120 and converts the image or data into an image. Conventional devices performing this function are applicable to the present invention.

Also, the broadcasting-content-producing module 123 may provide a function of editing the produced broadcasting content.

The control module 125 provides a function of uploading the broadcasting schedule prepared by the broadcasting schedule generating module 121 or the broadcasting content produced by the broadcasting content producing module 123 to the broadcasting server 130 through the communication interface module 127.

Also, the control module 125 provides a function of determining the uploading of the broadcasting content, depending on whether the broadcasting channel is established in the broadcasting server 130.

The communication interface module 127 provides a function enabling the producer client 120 to communicate with the broadcasting server 130 through the network 140 according to a predetermined communication protocol.

Figure 5:
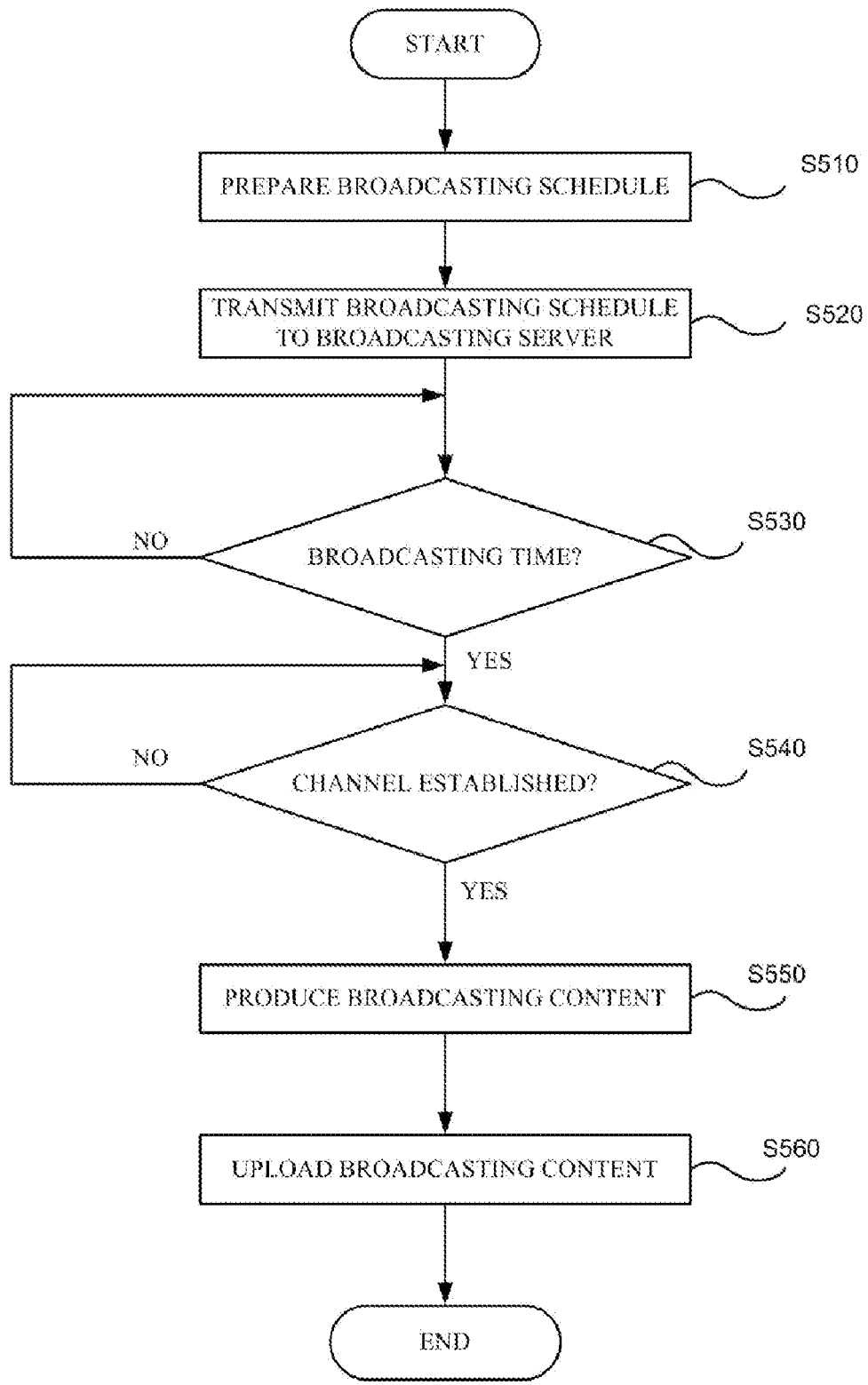
FIG. 5 is a flowchart illustrating the operation of a producer client according to an exemplary embodiment of the present invention.

The operation of the respective elements as shown FIG. 4 will be described in detail with reference to the flowchart as shown in FIG. 5 in the following.

First, the broadcasting producer 110 prepares the broadcasting schedule by using the interface provided by the broadcasting-schedule-producing module 121 (S510). After the broadcasting producer 110 is allocated with a specified time zone for the broadcasting channel from the broadcasting server 130, the broadcasting producer 110 may set broadcasting schedule information, such as a title of a broadcast, a broadcasting time, contents of the broadcast, and so forth, within the allocated time to prepare the broadcasting schedule.

Then, the control module 125 transmits the prepared broadcasting schedule to the broadcasting server 130 through the communication interface module 127 (S520).

If the broadcasting time scheduled by the broadcasting producer 110 arrives, the control module 125 communicates with the broadcasting server 130 through the interface module 127 according to the request of the broadcasting producer 110 or a predetermined program. Through this communication, the control module 125 verifies whether the broadcasting channel for the personal broadcast of the broadcasting producer 110 is established in the broadcasting server 130 (S530) and (S540).

In the case that the broadcasting channel is established in the broadcasting server 130, the broadcasting-content-producing module 123 produces the broadcasting content (S550), and the control module 125 uploads the produced broadcasting content to the broadcasting server 130 through the communication interface module 127 (S560). In this case, the broadcasting content can be transmitted to the broadcasting server 130 in a streaming form.

Although FIG. 5 shows that the broadcasting content is produced after the broadcasting channel is established in the broadcasting server 130, the broadcast content may be produced by the broadcasting content producing module 123 before the broadcasting channel is established. The former may be applied to live broadcasting, while the later may be applied to filmed broadcasting.

Figure 6:
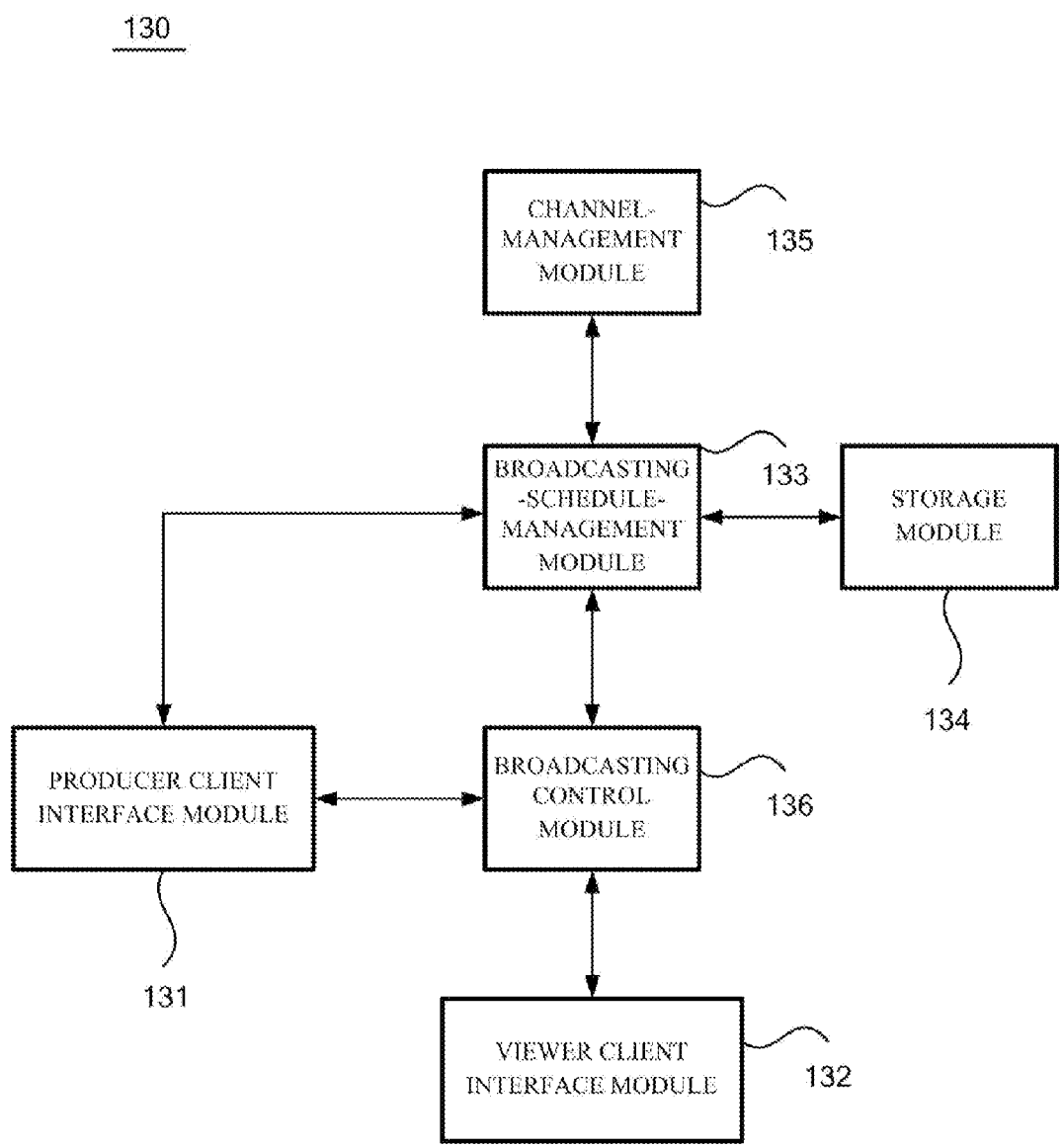
FIG. 6 is a view illustrating the construction of a broadcasting server according to an exemplary embodiment of the present invention.

FIG. 6 is a view illustrating the construction of the broadcasting server according to an exemplary embodiment of the present invention.

Referring to FIG. 6, the broadcasting server 100 of the present invention includes a producer client interface module 131, a viewer client interface module 132, a broadcasting schedule management module 133, a storage module 134, a channel management module 135, and a broadcasting control module 136.

The producer client interface module 131 and the viewer client interface module 132 are interfaces to communicate with the producer client 120 and the viewer client 150, respectively. Although the producer client interface module 131 and the viewer client interface module 132 are separately shown to classify their functions, they can be operated as a single communication interface module.

The storage module 134 stores the information on the broadcasting schedule transmitted from the respective producer clients, and stores the broadcasting list produced on the basis of the information.

The broadcasting schedule management module 133 manages the broadcasting schedule and the broadcasting list stored in the storage module 134, and checks the broadcasting schedule to verify the broadcasting content to be presently broadcast.

The channel management module 135 manages the broadcasting channel, for example, by establishing the broadcasting channel to transmit the broadcasting content from the producer client 120 to the viewer client 150, monitoring a state of the established channels (e.g., a data transfer rate, the number of viewer clients accessing the channel, and so forth), and closing the broadcasting channel of which the broadcast is terminated.

The broadcasting control module 136 transmits the broadcasting content produced by the broadcasting producer 110 from the producer client 120 to the viewer client 150 through the channel established by the channel-management module 135, and controls a flow of data configuring the broadcasting content according to the state of the channel. Also, the broadcasting control module 136 may control the number of viewer clients 150 that can access one channel.

Also, the broadcasting control module 136 may check whether the broadcasting content transmitted from the producer client 120 is proper.

Figure 7:
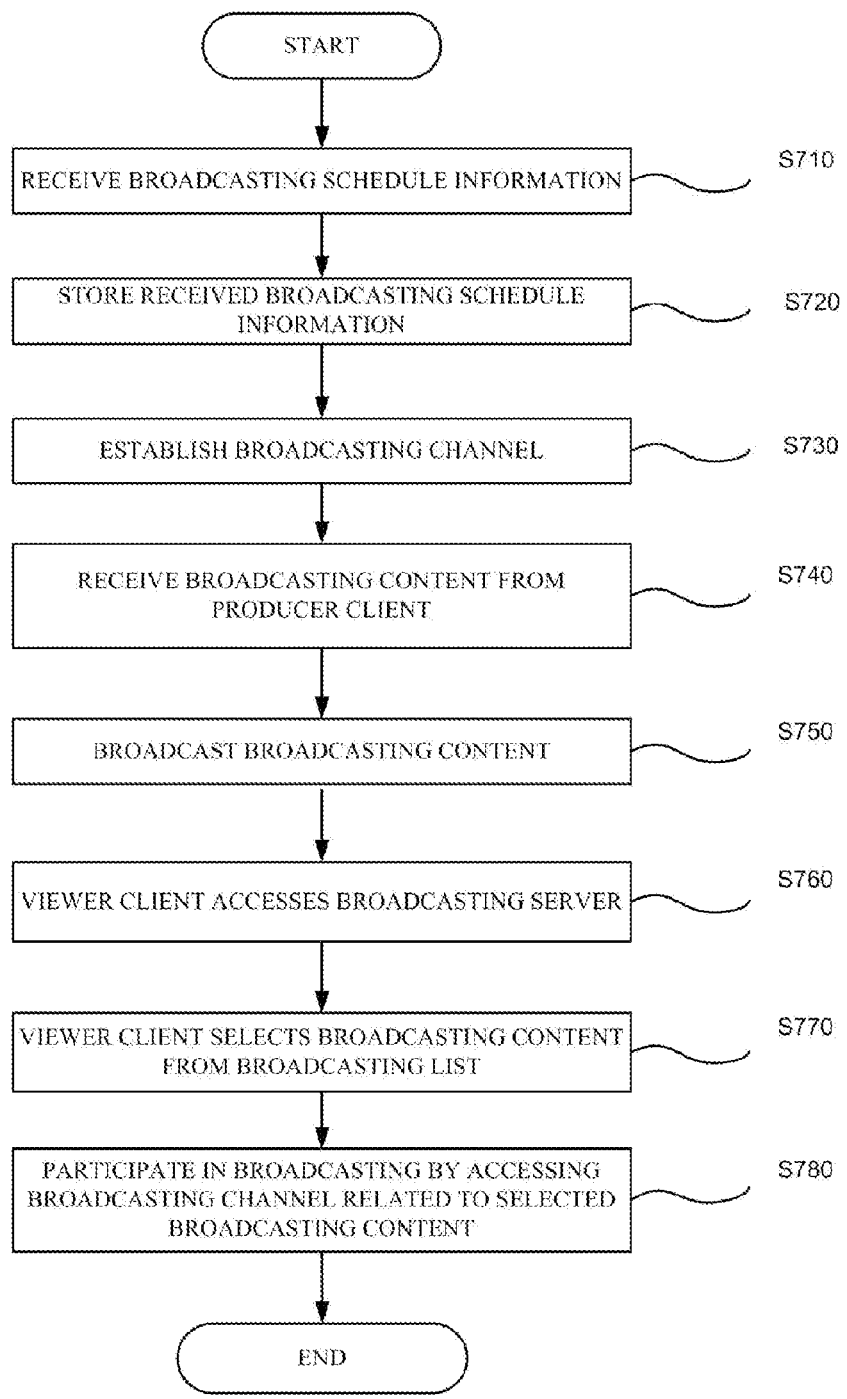
FIG. 7 is a flowchart illustrating the operation of a broadcasting server according to an exemplary embodiment of the present invention.

The operation of the respective elements shown FIG. 6 will be described in detail with reference to the flowchart shown in FIG. 7 in the following.

If the producer client interface module 131 receives the broadcasting schedule information from the producer client 120, it transmits the received broadcasting schedule information to the broadcasting schedule management module 133 (S710).

The broadcasting schedule management module 133 stores the broadcasting schedule information in the storage module 134 (S720). The respective broadcasting information received from a plurality of producer clients is stored in the storage module 134, and the broadcasting schedule management module 133 may prepare one new program table, which is provided by the broadcasting server 130, based on the plurality of broadcasting schedule information. The program table can be understood as a broadcasting list classified by hour.

The broadcasting schedule management module 133 may manage addition, update, deletion, and so forth, of the broadcasting schedule information.

If the broadcasting time arrives while the broadcasting schedule management module 133 manages the broadcasting schedule according to the program table, the channel-management module 135 establishes the broadcasting channel (S730).

Then, if the producer client interface module 131 receives the broadcasting content from the producer client 120 according to the broadcasting schedule (S740), the broadcasting control module 136 broadcasts the received broadcasting content through the established broadcasting channel (S750).

In this case, the viewer client 150 accesses the viewer client interface module 132 of the broadcasting server 130 through the network 140 (S760), and then selects the desired broadcasting content among the broadcasting content being presently broadcast, with reference to the broadcasting list managed by the broadcasting schedule management module 133 (S770). The viewer client 150 accesses the broadcasting channel broadcasting the selected broadcasting content under the control of the broadcasting control module 136 (S780). In this case, the broadcasting control module 136 may provide a viewer interface displaying the broadcasting content for the viewer client 150.

At this time, a plurality of viewer clients can access the viewer client interface module 132 to view the broadcasting content produced by the producer client 120 through the same broadcasting channel. Also, the viewer interface may include a message window, in which a message is interchanged, in addition to a broadcasting window, in which the broadcasting content is displayed.

In the embodiment of the present invention, the term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to be executed one or more CPUs in a device or a secure multimedia card.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for providing a broadcasting service, the system comprising:

a producer client which provides and transmits a broadcasting schedule;

a broadcasting server which establishes a broadcasting channel according to the broadcasting schedule transmitted by the broadcasting server, and provides broadcasting content produced by the producer client through the broadcasting channel; and a viewer client which receives the broadcasting content through the broadcasting channel which connects the producer client and the viewer client via the broadcasting server for transmitting the broadcasting content through the broadcasting channel, wherein the broadcasting schedule comprises information on a broadcasting time and content of a broadcast, the broadcasting server autonomously initiates establishing a connection of the broadcasting channel between the viewer client and the broadcasting server for the broadcasting content in response to the broadcasting time which corresponds to the broadcasting content, wherein the broadcasting schedule comprises information on an end broadcasting time of the broadcast, and the broadcasting server closes the broadcasting channel between the producer client and the broadcasting server for the broadcasting content at the end broadcasting time, and wherein the broadcast server autonomously initiates the establishing a connection of the broadcasting channel between the producer client and the broadcasting server for the broadcasting content in response to the broadcasting time which corresponds to the broadcasting content.

2. The system of claim 1, wherein the producer client automatically transmits the broadcasting content to the broadcasting server when the producer client determines that the broadcasting channel is established by the broadcasting server in response to the broadcasting time.

3. A producer client comprising:

a broadcasting schedule producing module which produces a broadcasting schedule;

a control module which transmits the prepared broadcasting schedule to a broadcasting server;

a broadcasting-content-producing module which produces broadcasting content related to a broadcast configuring the broadcasting schedule; and at least one processor operably coupled to at least one of the broadcasting schedule producing module, the control module and the broadcasting-content-producing module, wherein the broadcasting schedule comprises information on a broadcasting time and content of a broadcast, and the broadcasting server autonomously initiates establishing a connection of a broadcasting channel between the viewer client and the broadcasting server for the broadcasting content in response to the broadcasting time which corresponds to the broadcasting content, and wherein the broadcasting channel connects the producer client and the viewer client via the broadcasting server for transmitting the broadcasting content through the broadcasting channel, wherein if the control module determines that the broadcasting channel is established in the broadcasting server according to the broadcasting schedule, the control module transmits the broadcasting content to the broadcasting server, wherein the broadcasting schedule comprises information on an end broadcasting time of the broadcast, and the broadcasting server closes the broadcasting channel between the producer client and the broadcasting server for the broadcasting content at the end broadcasting time, and wherein the broadcast server autonomously initiates the establishing a connection of the broadcasting channel between the producer client and the broadcasting server for the broadcasting content in response to the broadcasting time which corresponds to the broadcasting content.

4. The producer client of claim 3, wherein the control module automatically transmits the broadcasting content to the broadcasting server when the control module determines that the broadcasting channel is established by the broadcasting server in response to the broadcasting time.

5. A broadcasting server comprising:

a broadcasting schedule management module which manages broadcasting schedule information provided by a producer client;

a channel management module which establishes a broadcasting channel according to the broadcasting schedule information;

a broadcasting control module which broadcasts broadcasting content related to a broadcast according to the broadcasting schedule through the broadcasting channel which connects the producer client and a viewer client via the broadcasting server for transmitting the broadcasting content through the broadcasting channel; and at least one processor operably coupled to at least one of the broadcasting schedule management module, the channel management module and the broadcasting control module, wherein the broadcasting schedule comprises information on a broadcasting time and content of a broadcast, and the channel management module autonomously initiates establishing a connection of the broadcasting channel between the viewer client and the broadcasting server for the broadcasting content in response to the broadcasting time which corresponds to the broadcasting content, wherein the broadcasting schedule comprises information on an end broadcasting time of the broadcast, and the channel management module closes the broadcasting channel between the producer client and the broadcasting server for the broadcasting content at the end broadcasting time, and wherein the channel management module autonomously initiates establishing a connection the broadcasting channel between the producer client and the broadcasting server for the broadcasting content in response to the broadcasting time which corresponds to the broadcasting content.

6. The broadcasting server of claim 5, wherein the producer client automatically transmits the broadcasting content to the broadcasting server when the producer client determines that the broadcasting channel is established by the broadcasting server in response to the broadcasting time.

7. A method of providing a broadcasting service, the method comprising:

producing a broadcasting schedule;

transmitting the broadcasting schedule to a broadcasting server;

producing broadcasting content related to a broadcast configuring the broadcasting schedule;

establishing a broadcast channel by the broadcasting server between a viewer client and the broadcasting server, wherein the broadcast channel connects the viewer client and the broadcasting server for transmitting the broadcasting content through the broadcasting channel; and if the broadcasting channel is established according to the broadcasting schedule in the broadcasting server, transmitting the produced broadcasting content to the broadcasting server, wherein the broadcasting schedule comprises information on a broadcasting time and content of a broadcast, and the broadcast server autonomously initiates the establishing a connection of the broadcasting channel between the viewer client and the broadcasting server for the broadcasting content in response to the broadcasting time which corresponds to the broadcasting content, wherein the broadcasting schedule comprises information on an end broadcasting time of the broadcast and the broadcasting server closes the broadcasting channel between the producer client and the broadcasting server for the broadcasting content at the end broadcasting time, and wherein the broadcast server autonomously initiates the establishing a connection of the broadcasting channel between the producer client and the broadcasting server for the broadcasting content in response to the broadcasting time which corresponds to the broadcasting content.

8. The method of claim 7, wherein the producer client automatically transmits the broadcasting content to the broadcasting server when the producer client determines that the broadcasting channel is established by the broadcasting server in response to the broadcasting time.

9. A method of providing a broadcasting service, the method comprising:

storing broadcasting schedule information provided by a producer client;

establishing a broadcasting channel according to the broadcasting schedule information, wherein the broadcasting channel connects a viewer client and a broadcasting server for transmitting the broadcasting content through the broadcasting channel; and broadcasting content related to a broadcast according to the broadcasting schedule through the broadcasting channel, and accessing the broadcasting channel to view the broadcasting content, wherein the broadcasting schedule comprises information on a broadcasting time and content of a broadcast, and the broadcast server autonomously initiates the establishing a connection of the broadcasting channel between the viewer client and the broadcasting server for the broadcasting content in response to the broadcasting time which corresponds to the broadcasting content, wherein the broadcasting schedule comprises information on an end broadcasting time of the broadcast, and the broadcasting server closes the broadcasting channel between the producer client and the broadcasting server for the broadcasting content at the end broadcasting time, and wherein the broadcast server autonomously initiates the establishing a connection of the broadcasting channel between the producer client and the broadcasting server for the broadcasting content in response to the broadcasting time which corresponds to the broadcasting content.

10. The method of claim 9, wherein the producer client automatically transmits the broadcasting content to the broadcasting server when the producer client determines that the broadcasting channel is established by the broadcasting server in response to the broadcasting time.

11. A method of providing a broadcasting service, the method comprising:

at a producer client, producing and transmitting a broadcasting schedule;

at a broadcasting server, establishing a broadcasting channel according to the broadcasting schedule, and providing broadcasting content produced by the producer client through the broadcasting channel which connects the producer client and a viewer client via the broadcasting server for transmitting the broadcasting content through the broadcasting channel; and receiving, at a viewer client, the broadcasting content through the broadcasting channel, wherein the broadcasting schedule comprises information on a broadcasting time and content of a broadcast, and a broadcast server autonomously initiates the establishing a connection of the broadcasting channel between the viewer client and the broadcasting server for the broadcasting content in response to the broadcasting time which corresponds to the broadcasting content, wherein the broadcasting schedule comprises information on an end broadcasting time of the broadcast, and the broadcasting server closes the broadcasting channel between the producer client and the broadcasting server for the broadcasting content at the end broadcasting time, and wherein the broadcast server autonomously initiates the establishing a connection of the broadcasting channel between the producer client and the broadcasting server for the broadcasting content in response to the broadcasting time which corresponds to the broadcasting content.

12. The method of claim 11, wherein the producer client automatically transmits the broadcasting content to the broadcasting server when the producer client determines that the broadcasting channel is established by the broadcasting server in response to the broadcasting time.

* * * * *